United States Patent [19]

Scheller et al.

[11] 3,995,361
[45] Dec. 7, 1976

[54] PRESTRESSED DOUBLE ACTION FORCING PRESS

[75] Inventors: Dennis M. Scheller; Lanny R. Sanner; Granville Woolman, all of Granite Falls, Minn.

[73] Assignee: Victor Fluid Power, Eden Prairie, Minn.

[22] Filed: Oct. 20, 1975

[21] Appl. No.: 624,768

[52] U.S. Cl. .................................. 29/251; 29/252; 29/208 C
[51] Int. Cl.² .................................... B23P 19/02
[58] Field of Search ................ 29/251, 252, 208 C; 100/43, 47

[56] References Cited
UNITED STATES PATENTS

| | | | |
|---|---|---|---|
| 1,196,963 | 9/1916 | Mahr | 29/252 |
| 2,878,559 | 3/1959 | Ryan et al. | 29/252 |
| 2,934,819 | 5/1960 | Sorensen | 29/252 |
| 3,050,837 | 8/1962 | Reed et al. | 29/252 X |
| 3,713,198 | 1/1973 | Tobak et al. | 29/208 C |
| 3,810,293 | 5/1974 | Tobak et al. | 29/208 C |

*Primary Examiner*—Al Lawrence Smith
*Assistant Examiner*—Roscoe V. Parker
*Attorney, Agent, or Firm*—Douglas L. Carlsen

[57] ABSTRACT

A forcing press for simultaneously pressing members onto opposite ends of a central member, such as railroad wheels onto an axle, wherein the press is prestressed by exerting balancing force against opposite ends of the axle prior to pressing the wheels onto the ends of the axle and including mechanism for simultaneously pressing the wheels onto the axle.

12 Claims, 7 Drawing Figures

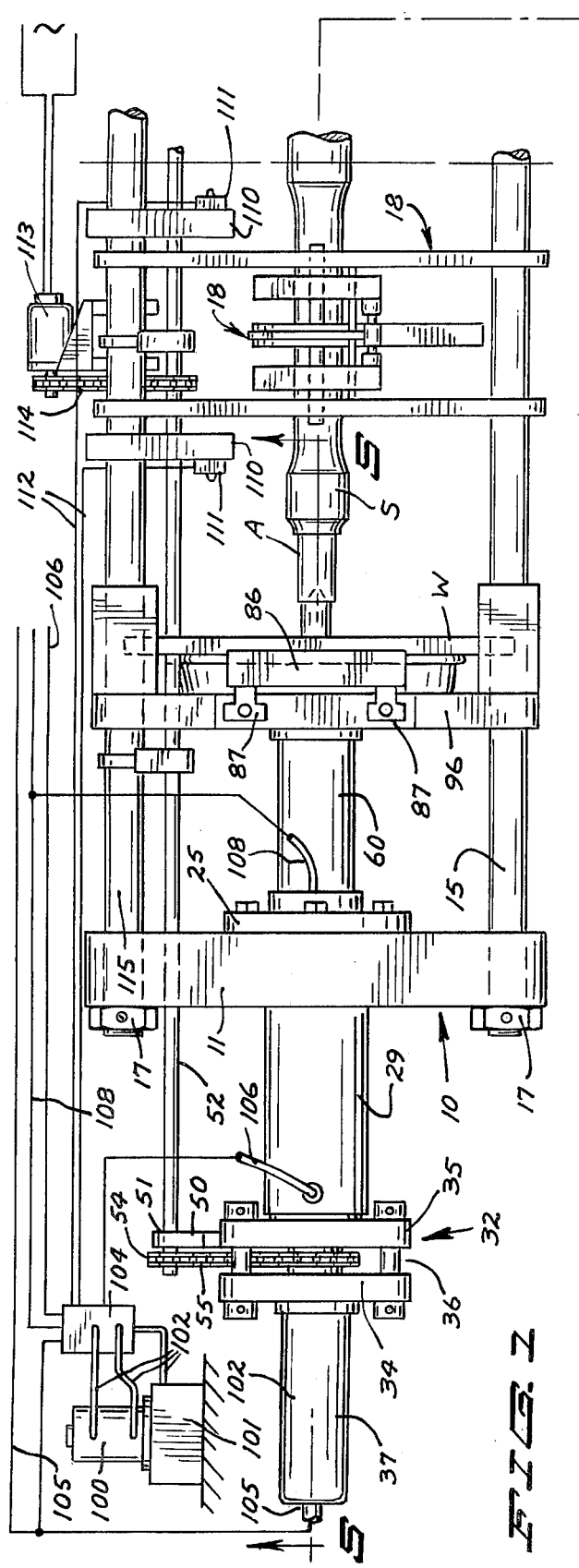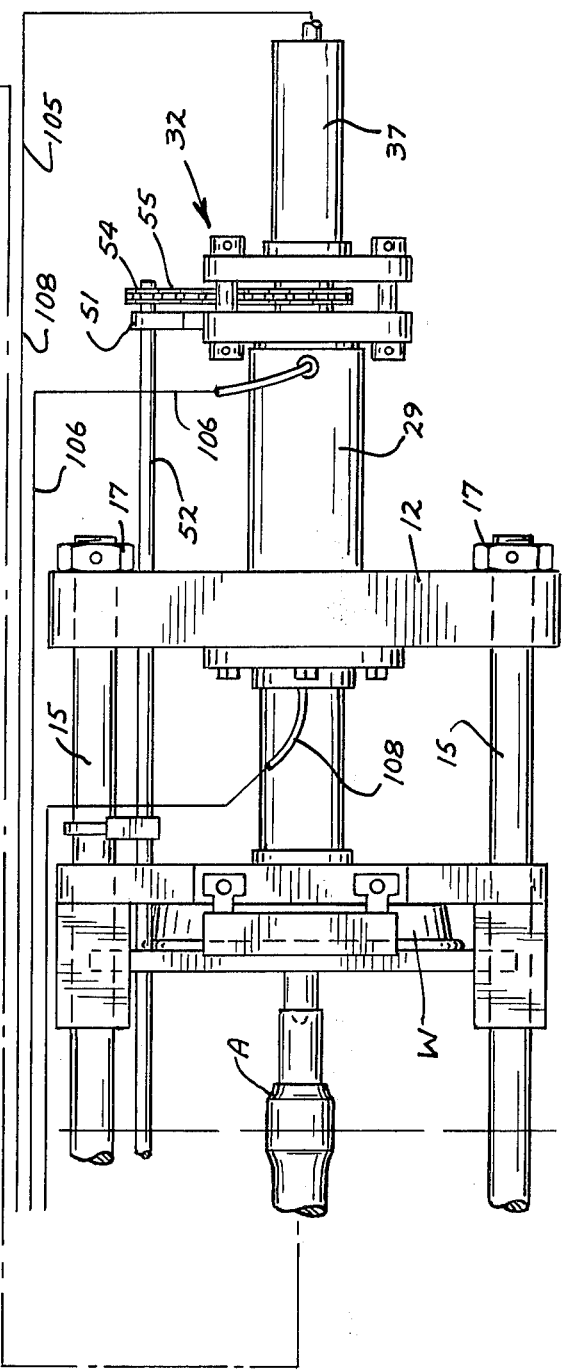
FIG. 2

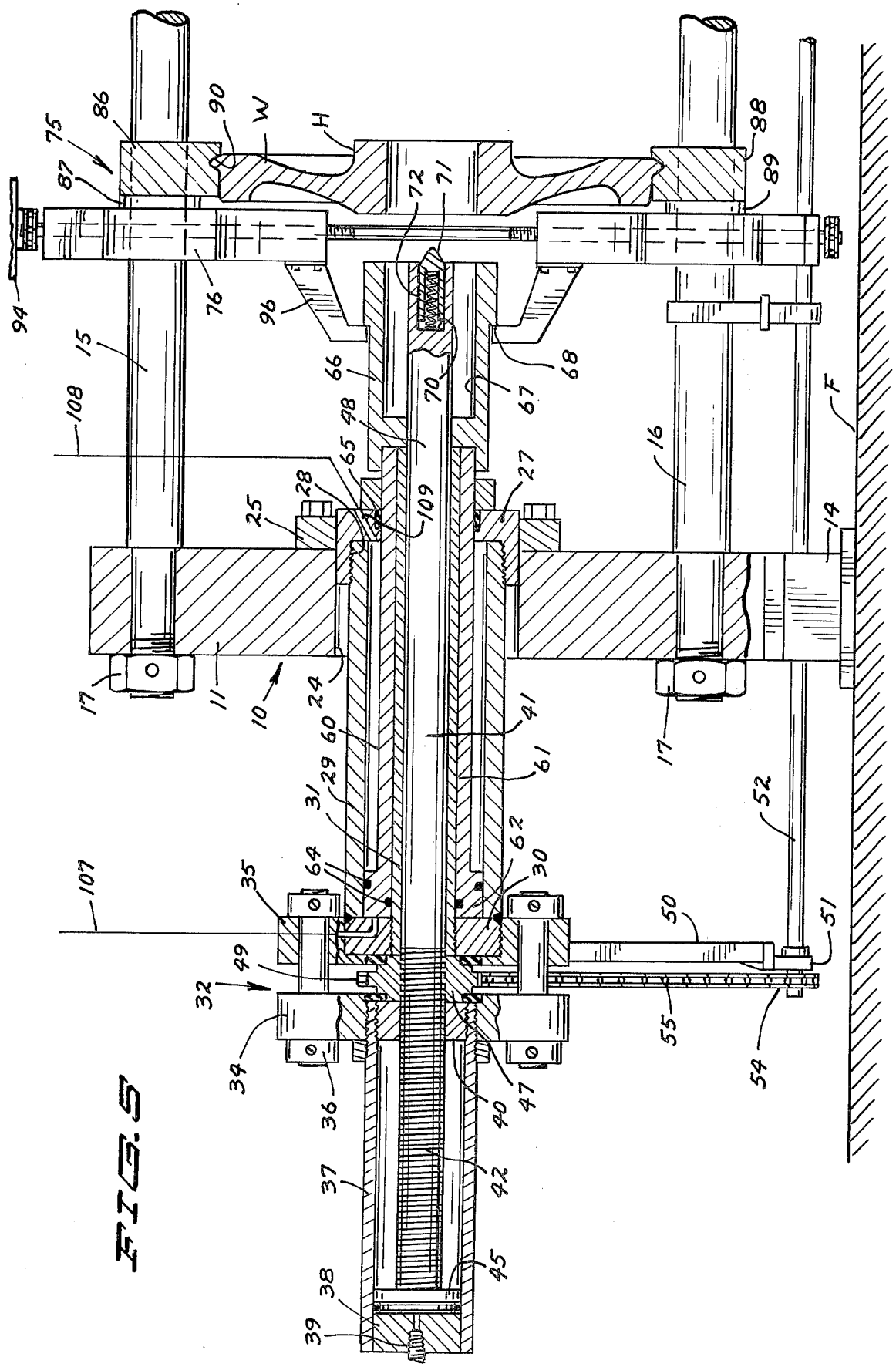

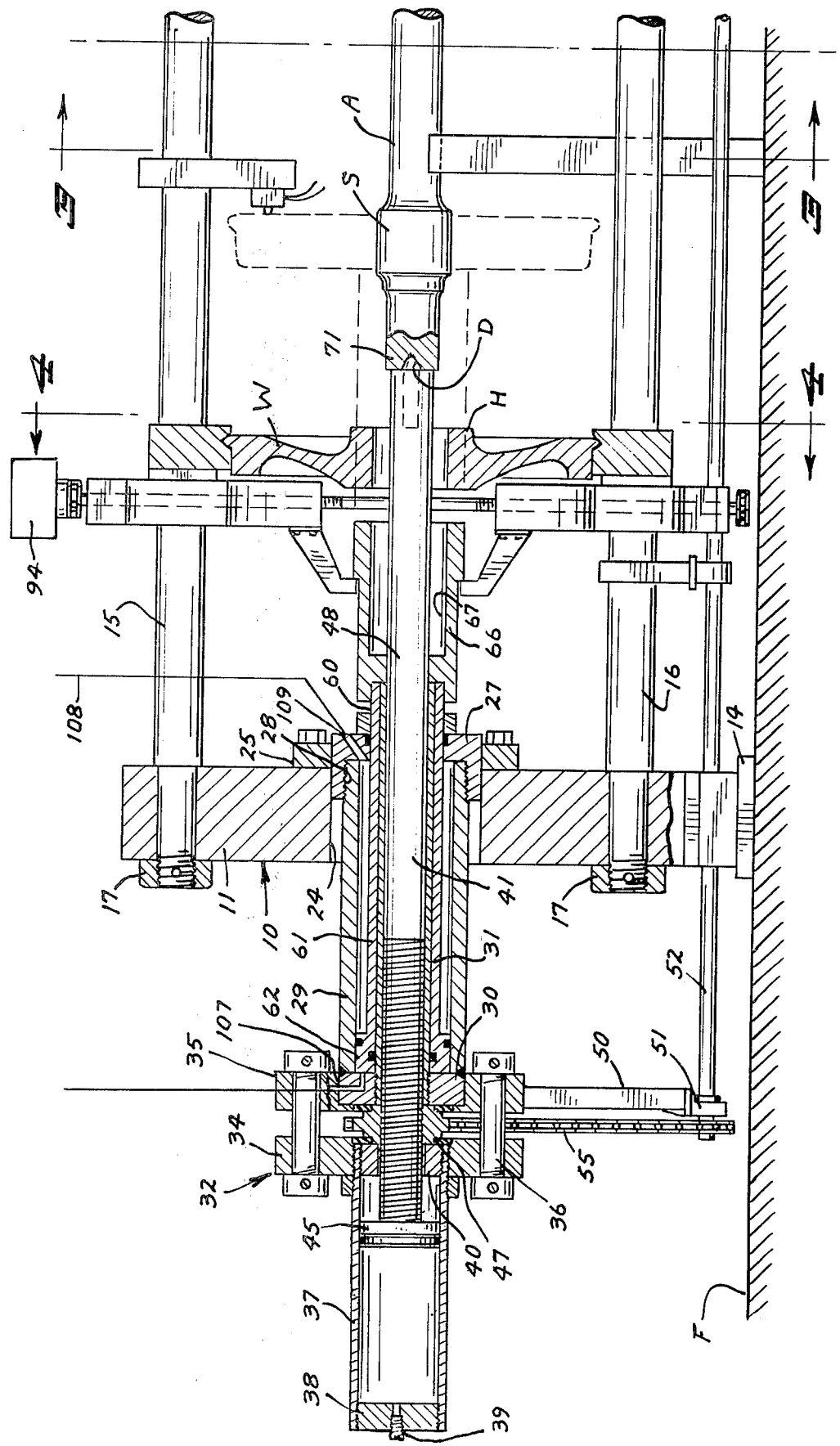

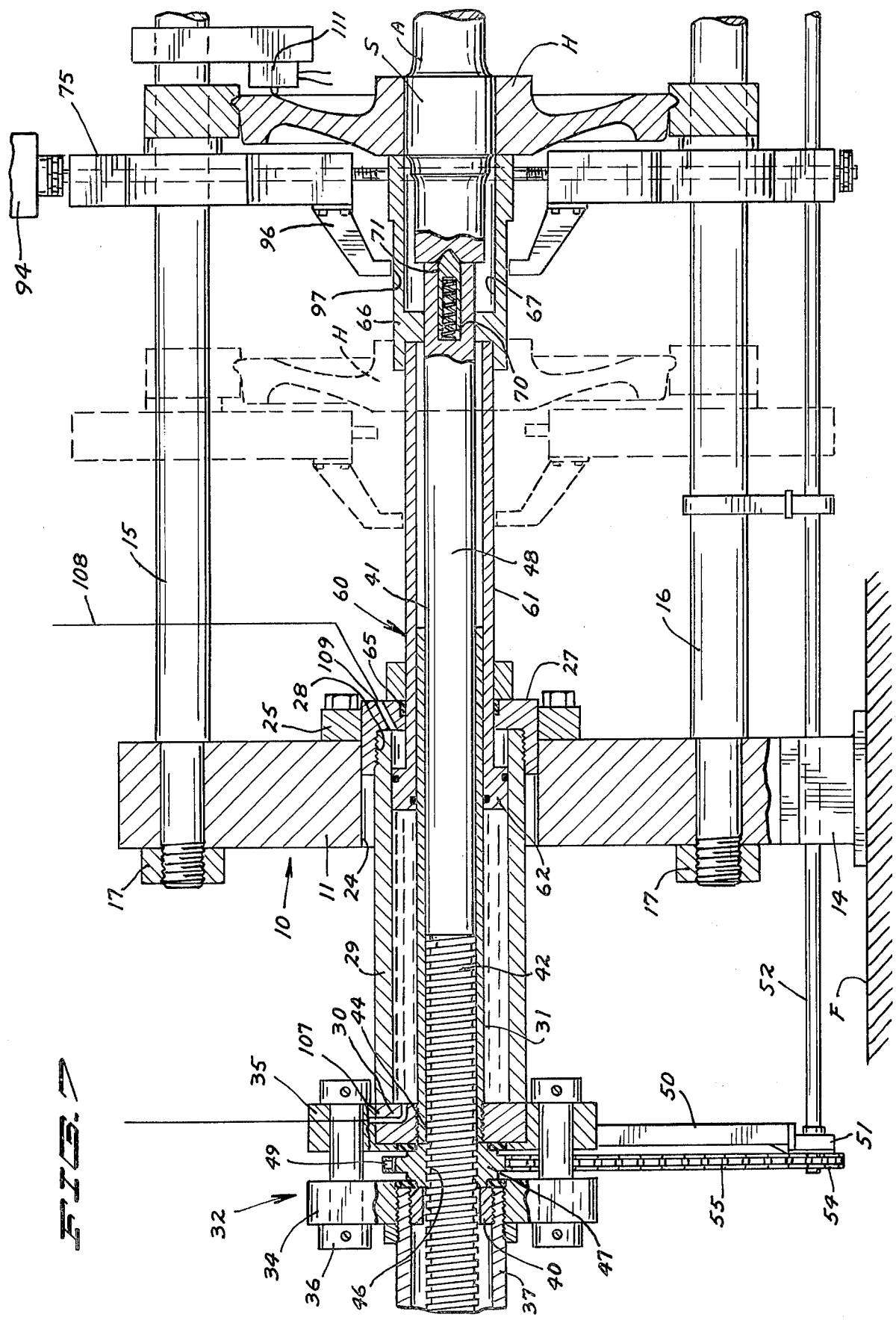

PRESTRESSED DOUBLE ACTION FORCING PRESS

BACKGROUND OF THE INVENTION

This invention relates generally to the art of forcing presses wherein an item such as a railroad wheel is press fit onto its carrying axles. More particularly the invention concerns such presses where the accuracy of mounting is critical for satisfactory performance and wear of the assembly. The invention further concerns forcing presses of the double-ended type where parts are press fit onto both ends of a shaft or axle or the like.

In conventional railroad or other track vehicle wheel assemblies the wheels are press fit onto opposite ends of the wheel carrying axle. It is critical in the manufacture of a quality wheel and axle assembly that the wheels be accurately mounted with the spacing between the inner faces of the wheels being constant throughout the wheel peripheries. The distance between the inside faces of the wheels must be within a close tolerance. Such axles are relatively expensive and it is accordingly common practice to reuse them with different sets of wheels. When the wheels wear out they are removed from the axle. The wheel seats on the axle are then machined on a lathe to receive new wheels, the hubs of which have been machined to fit the new wheel seats.

Examples of this type of wheel press are found in U.S. Pat. Nos. 2,934,819 to Sorensen; 2,878,559 to Ryan et al.; 3,713,198 and 3,810,293 both to Tobak et al.; and 3,050,837 to Reed et al. In these machines the wheels are forced onto the axles, first to one end and then the other.

Obviously railroad car wheel assemblies are subjected to tremendous weights and stresses. It is accordingly necessary to press the wheel onto the axle under tremendous force in order that the strongest possible connection therebetween be obtained. Such force frequently exceeds 180 tons. Under such force it is very difficult to hold the axle in immovable position as the wheel is pressed thereon particularly where the wheels are independently mounted as in the patents identified above. Any movement of the wheel or axle from their common axis during mounting results in distortions in the final assembly which, even though slight, do not meet specifications and the assembly cannot be used.

SUMMARY OF THE INVENTION

An object of the present invention is to provide a press for forcing one member onto another, such as a wheel onto an axle, wherein the press is prestressed so that when the external forces are applied to the members being assembled there will be no distortion of the press.

Another object of the invention is to provide a forcing press for press fitting a component onto a workpiece wherein the press is prestressed by exerting holding force on the workpiece itself.

Still another object of the invention is to provide a double-ended press for forcing wheels or the like onto opposite ends of a shaft wherein the opposed pressing heads operate simultaneously.

With these and other objects in view the invention broadly comprises a frame having spaced upright supports connected by tie rods, the supports supporting a first pair of axially aligned opposing hydraulic jack members adapted to engage against and exert force against opposite ends of an axle held therebetween so as to stretch and prestress the frame tie rods and other structural frame members, a second pair of axially aligned opposing hydraulic jack members adapted to engage against and force wheels onto the ends of the axle held by the first pair of jack members, and there being mechanism interconnecting the first pair of jacks to synchronize their movement and equalize the force exerted by each.

BRIEF DESCRIPTION OF THE DRAWINGS

In the drawings:

FIG. 1 is a plan view of the press broken into two parts, because of the length of the view, showing the press in a prestressed condition prior to the forcing of the wheels on the axle.

FIG. 5 is a longitudinal vertical section through the left end portion of the machine taken on line 5—5 of FIG. 1 and with the press in unstressed condition.

FIG. 6 is similar to FIG. 5 but with the press in prestressed condition as in FIG. 1 and prior to the wheel mounting.

FIG. 7 is also similar to FIG. 5 but slightly enlarged and showing the wheel mounted on the axle.

DESCRIPTION OF THE PREFERRED EMBODIMENT

Figure 2:
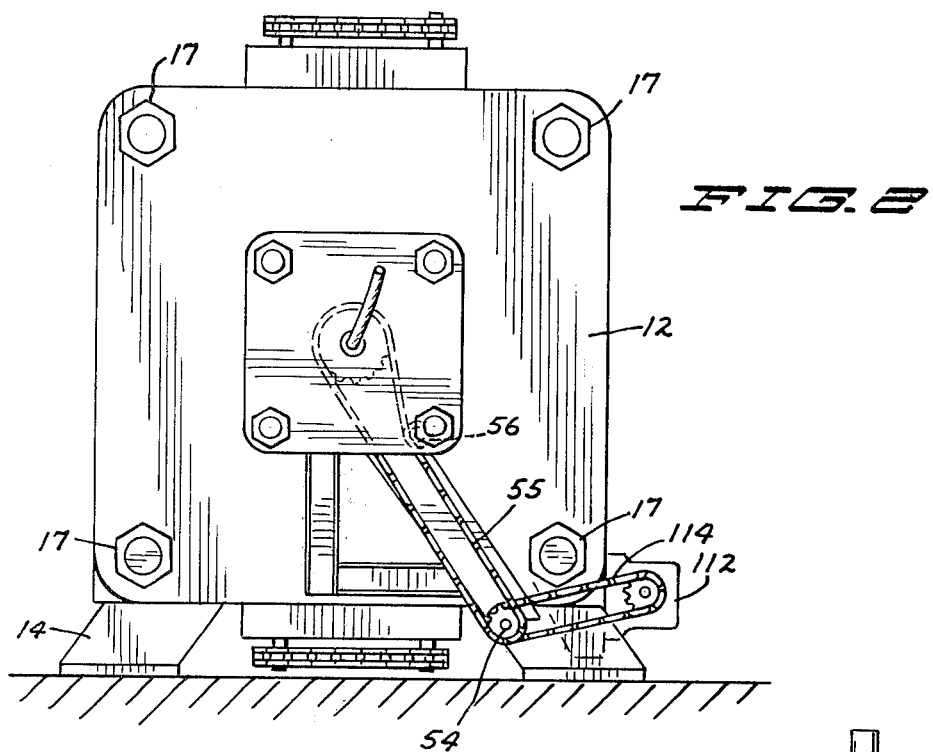
FIG. 2 is an end elevation of the machine as viewed from the right end in FIG. 1.

Referring now more particularly to the drawings reference numerals will be used to denote like parts and structural features in the different views. The supporting frame of the machine is designated generally by the numeral 10 and comprises a pair of spaced upright support standards 11 and 12 having bottom legs 14 which rest upon the floor F. Standards 11 and 12 are interconnected by upper and lower pairs of tie rods respectively denoted at 15 and 16. All of the tie rods 15 and 16 are in horizontal parallelism with the rods in each pair being on the same horizontal plane. The rods have threaded ends and are secured to the standards 11 and 12 by lock nuts 17 so that the standards and tie rods form a generally box-shaped rigid frame structure.

Figure 3:
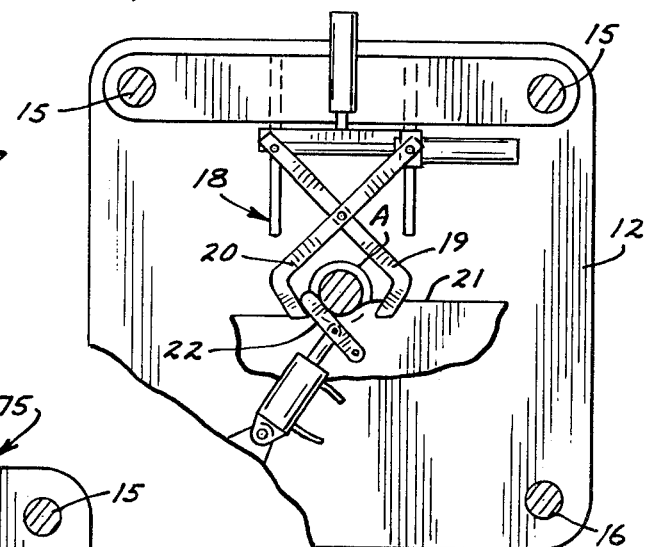
FIG. 3 is a transverse vertical section taken on line 3—3 of FIG. 6 showing the axle holding mechanism.

A mechanism denoted generally at 18 for loosely holding a railroad car wheel axle A or the like is supported by the upper tie rods 15 so as to hold the axle A in horizontal position midway between and parallel to rods 15 and 16. The construction of this mechanism does not form a part of the present invention. Accordingly it will not be described in detail. It is believed sufficient to say that pairs of opposing jaws 19 and 20 are initially in a raised open position wherein axle A may roll down ramp 21 against a retractable stop gate 22 (see FIG. 3). This gate 22 holds the axle in pick up position until the jaws 19 and 20 are lowered and closed around the axle lifting it from the ramp 21 to a suspended position preliminary to end gripping as will be later described.

As hereinbefore mentioned the end portions of the machine are reversely identical. Accordingly only the portion of the machine shown at the left-hand side of FIG. 1 will be described in detail, it being understood that the components and features described have the same form and arrangement on the right side. Also for clarity of understanding the words "inner" and "outer" or "inwardly" and "outwardly" will respectively relate to directions toward or away from the longitudinal center of the press.

Standard 11 has a circular opening 24 extending through the central portion thereof. A mounting plate 25 secures a cylinder head 27 within the opening 24. Cylinder head 27 has an internally threaded annular wall 28 which has a threaded connection with the inner end of a cylinder 29 to provide a rigid mounting of the cylinder in the standard 11. Cylinder 29 is capped at its outer end by a plate 30. This plate fixedly supports the outer end of a tube 31 which extends inwardly and coaxially through cylinder 29.

A frame structure 32 comprising a pair of spaced plates 34 and 35 rigidly interconnected by cross bolt and nut assemblies 36 is mounted on the cap 30. The outer plate 34 rigidly supports the inner end of an outwardly extending cylinder 37. The outer end of cylinder 37 is closed by an end cap 38 which is provided with a hydraulic fluid entrance passageway 39, while the inner end of cylinder 37 has an inner end cap 40.

It will now be understood that the members 25, 27, 29, 30, 31, 34, 35, 36, 37, 38 and 40 are all rigid with standard 11 and accordingly actually form an integral part of the frame 10.

A ram 41 is mounted to extend axially through the cylinders 37 and tube 31. This ram has an outer end section 42 provided with an external square threaded screw 44 (FIG. 7) inward of its piston and seal assembly 45. Section 42 extends inwardly through a center opening in the end cap 40 and then the screw 44 has a threaded engagement with internal threads 46 in a sprocket 47 held captive for rotation onto section 42 between plates 30 and 40. The inner or forward section of ram 41 is denoted by numeral 48 and has a longitudinal sliding fit within the tube 31 and extends inwardly substantially therebeyond.

It will be understood that when hydraulic fluid is admitted into cylinder 37 under pressure through the passageway 39 against the piston and seal assembly 45 the ram 41 will be forced inwardly through the cylinder 37, frame structure 32, and tube 31 portions of the frame 10.

As the ram 41 and screw 44 are advanced inwardly the sprocket 47 is rotated about the axis of the ram. The purpose of the sprocket 47 and its associated structure will now be described. The sprocket has a series of teeth 49 about its periphery.

A support leg denoted generally at 50 extends downwardly from the plate 35 and is rigidly connected thereto. This leg carries a bearing 51 at its lower end which journals the end portion of a shaft 52 which extends longitudinally of the press to a corresponding bearing 51 at the other end of the machine.

Shaft 52 extends outwardly slightly beyond the bearing 51 and carries a sprocket 54 which is disposed in transverse vertical alignment with the sprocket 47. A drive chain 55 is trained around sprockets 47 and 54 to transmit rotation of one sprocket to the other.

Referring briefly to FIG. 1 a power actuator 113 driven by any suitable power source has a driving connection through chain 114 with shaft 52. The rotation of shaft 52 by actuator 113 is transmitted to sprocket 47 through chain 55. Internal screw threads 46 on sprocket 47 are in threaded engagement with screw 44.

Thus the speed of inward movement of ram 41 is controlled by the rotation of sprocket 47.

Inasmuch as the right side of the press has the same sprocket and chain assembly and they are interconnected through shaft 52 it will be understood that sprockets 47 at each end will have synchronized rotation. Accordingly, as hydraulic fluid is admitted through ports 39 to advance rams 41 inwardly as hereinbefore described the sprocket, chain and shaft assembly just described which interconnects the rams 41 at both ends will ensure synchronous inward and outward movement of the rams in both speed and distance. The threads 44 at the opposite ends are, of course, reversed. Ram 41 may be referred to as either the axle holding or prestressing ram as it serves both functions. A second ram also disposed principally within the cylinder 29 and denoted generally at 60 may be referred to as the wheel forcing ram.

Ram 60, best observed in FIGS. 5 to 7, has a tubular section 61 which surrounds and is telescopically slidable on the tube 31. Section 61 has a diametrically enlarged piston 62 at its outer end which has a sliding fit within cylinder 29 and which is provided with seals 64 on its inner and outer faces (FIG. 5).

The ram section 61 extends inwardly and slidably through a center opening in the cylinder head 27 which has a seal 65 recessed therein. A cylindrical pressing collar or head 66 is mounted on the inner end of ram section 61. It will be noted that this collar is diametrically larger than section 61 and has an inwardly opening axial recess 67 into which the inner end portion of the ram section 48 projects and is sufficiently large to receive the end of the axle A upon which the wheels are to be mounted. The inner end of collar 66 is slightly enlarged to form an outwardly facing shoulder 68 therearound.

The inner end of ram 41 is provided with an inwardly opening axial recess 70 which seats on axle center 71 biased to protrude inwardly from the end of the ram by a compression spring 72.

Figure 4:
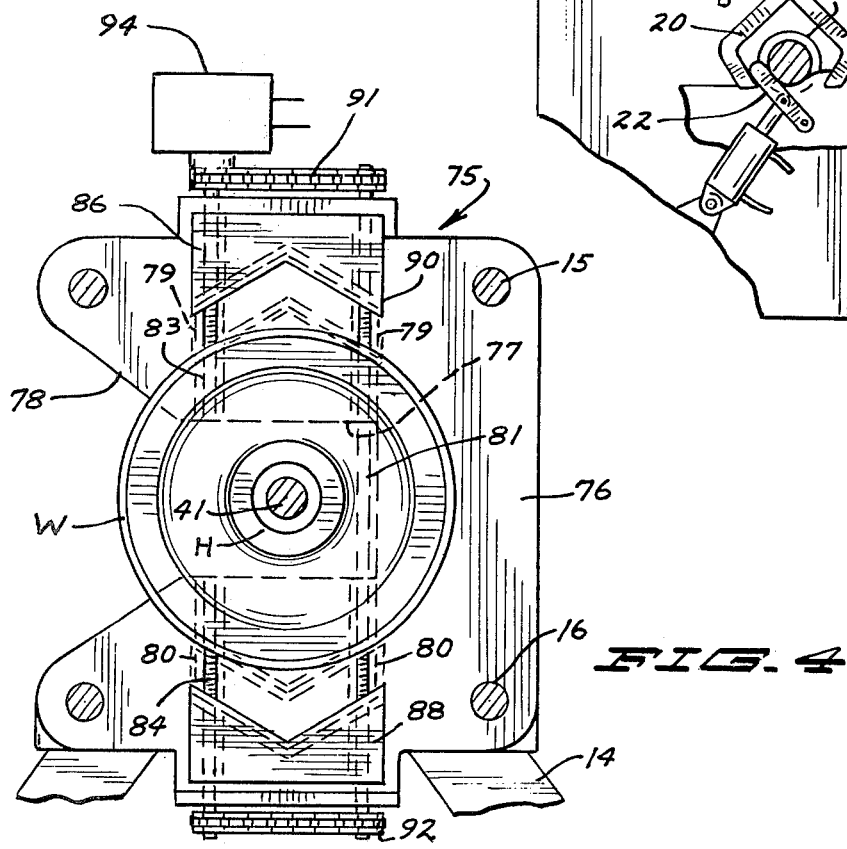
FIG. 4 is a transverse vertical section through the machine taken on line 4—4 of FIG. 6 and showing the closed or contracted position of the wheel holding jaws in broken lines.

The assembly for supporting the wheel to be mounted on axle A prior and during mounting on the axle will now be described. The assembly is denoted generally at 75 and again the assemblies at each end of the machine are identical so that only one will be described in detail, reference being particularly made to FIGS. 4 and 5. A support plate 76 is mounted for free longitudinal sliding movement along tie rods 15 and 16. The plate 76 has a large central opening 77 which is exposed through one side of the plate by a V-shaped cut out 78. This is to permit discharge of the axle A from the apparatus after the wheels have been mounted thereon.

The plate 76 is provided with upper and lower sets of parallel vertical guideways respectively denoted at 79 and 80. The guideways 79 and 80 adjacent the closed side of opening 77 have a single elongated screw shaft 81 extending therethrough while the other guideways 79 and 80 respectively have independent screws 83 and 84 extending therethrough so as not to extend across the side of opening 77 communicating with cut out 78. An upper wheel jaw 86 has integral slide portions 87 slidably mounted in the upper guideways 79 with said portion being in screw threaded engagement with the screw 83 and shaft 81. Similarly, a lower wheel jaw 88 has integral slide portions 89 (FIG. 5) which are slidably mounted in the lower guideways 80 with said portions in screw threaded engagement with screw 84 and shaft 81.

The jaws 86 and 88 have V-shaped facing edges (FIG. 4) which are grooved transversely of the machine as at 90 (FIG. 5) so that the jaws might jointly and securely hold a railway car wheel W therebetween. The screws 83 and 84 and shaft 81 project beyond the upper and lower edges of plate 76 and carry sprockets which are joined by upper and lower chain loops 91 and 92. A power actuator 94 (FIG. 4) operated by any suitable power source, is mounted on shaft 83 for rotating the same. The chains 91 and 92 and the screws serve to synchronize movement of the jaws 86 and 88 toward and away from each other so that they are always equally spaced from the axis of piston 41.

A cup-shaped retractor collar 96 is mounted on the outer side of support plate 76. This collar has a center opening 97 which slidably receives the head 66.

Turning now primarily to FIG. 1, the hydraulic system for operating the press will be briefly described. Pump 100 draws hydraulic fluid from reservoir 101. Lines 102 connect the pump and reservoir to a valve assembly 104. Lines 105 lead to entrance passageways 39 at each end of the press. Lines 106 lead to ports 107 in caps 30 at the outer ends of the cylinders 29. Lines 108 lead to ports 109 in the cylinder head 27.

With continued reference to FIG. 1, brackets 110 are mounted on tie rods 15 at each side of the center of the press. These brackets support sensors 111 which are wired to valve assembly 104 by lines 112. As soon as a wheel W engages the sensor 111 the pressure to the cylinder 29 at that side of the machine is cut off. With the axle A centered longitudinally in the press, equal movement of each of the wheels onto its axle seat is assured.

Operation of the press will now be described. Initially each end of the press is in the condition shown in FIG. 5 with ram 41 fully retracted. Railroad car wheels W are positioned in each of the wheel supporting assemblies 75 and the jaws 86 and 88 are vertically closed thereagainst so that the wheel flange is seated in the jaw grooves 90. It will be understood that inasmuch as the wheel holding jaws move synchronously and equidistantly the hub H of the wheel will be held in axial alignment with rams 41 and 60.

An axle A having precision turned wheel seats S adjacent the ends thereof is admitted to axle holding mechanism 18 by rolling down ramp 21 against stop gate 22. In this position the axle A is in substantial axial alignment with ram 41 and axle center 71.

With the wheels and axle in the just described relative positions in the machine, hydraulic fluid is admitted through lines 105 into cylinders 37 at each end of the machine through passageways 39 forcing the rams 41 axially inward toward the ends of the axle A. As hereinbefore described the movement of the rams is synchronized through sprockets 49, chains 55 and shaft 52 all driven by actuator 113. As the axle centers 71 enter the lathe center depressions D in the ends of axle A, the axle will be brought into precise axial alignment with the hubs of wheels W. The press is then in the condition shown in FIGS. 1 and 6. Axle center will yield against spring 72 into the recess 70 until the inner end of ram 41 comes into flush endwise engagement with the end face of axle A. The interconnection of rams 41 through sprockets 47, chains 55 and shaft 52 assures that the axle will be longitudinally centered in the press.

When the press has been so prestressed fluid under pressure is admitted to the cylinders 29 simultaneously through the lines 106 and the ports 107 moving the rams 60 inwardly until press collars 66 engage against the outer faces of the wheel hubs H. With continued force the wheels W along with their supporting assemblies 75 will be moved inwardly until the wheel hubs have been forced onto the axle seats S and the press reaches the position shown in FIG. 7.

As the wheels are forced onto the axle each ton of force applied to the wheels relieves a ton of force from the axle holding press. The prestressing or preloading of the press to a force in excess of the wheel pressing force resists the latter force and assures that the axle will not move as the wheel is forced thereon. This assures a precision mounting of the wheels on the axle as there is no deformations of the press.

After the wheels have been mounted the heads 66 are withdrawn outwardly by admitting fluid to cylinders 29 through lines 108 and ports 109, the fluid already in the cylinder returning through lines 106. Ram 41 is mechanically withdrawn as power actuator 113 is energized to drive shaft 52 which has driving connections with sprockets 47 through chains 55. As the sprockets 47 rotate on screw threads 44 the rams 41 are returned equally to their initial positions. Jaws 19 and 20 are retracted and gate 22 withdrawn allowing the assembly to roll out of the press.

While this type of press seems to be particularly advantageous in the mounting of railroad wheels on axles it will be understood that the principle of prestressing the press through the workpiece to be held could be adapted to other applications.

Having now therefore fully illustrated and described our invention, what we claim to be new and desire to protect by United States Letters Patent is:

1. In a hydraulic forcing press for press fitting first and second members onto coaxially aligned seats on opposite sides of a central member,
   a. a frame having spaced standards rigidly interconnected by parallel tie rods,
   b. said standards respectively supporting cylinder means in axial alignment with each other on an axis parallel to and between said tie rods,
   c. each of said cylinder means including first and second rams with said first rams being axially aligned and said second rams being axially aligned,
   d. first hydraulic means for moving the first rams inwardly toward each other against the opposite sides of the central member to hold said member immovably therebetween and prestress the tie rods and other frame members,
   e. means on the frame for supporting said first and second members adjacent to the seats on the opposite sides of the central member and between the central member and said second rams, and
   f. a second hydraulic means for moving the second rams inwardly against said first and second members to force them onto the seats on the opposite sides of the central member.

2. The subject matter of claim 1 wherein each first ram is disposed coaxially within a second ram.

3. The subject matter of claim 1 wherein said cylinder means are in alignment and parallel to the tie rods.

4. The subject matter of claim 1 having means for synchronizing inward movement of the first rams against the central member so as to center the member between the cylinder means when it is held by said rams.

5. The subject matter of claim 4 wherein said synchronizing means includes a spiral screw on each first ram in threaded engagement with a trapped sprocket and with a power train connecting said sprockets whereby inward movement of the first rams will be equal.

6. The subject matter of claim 1 wherein said first rams are provided on their inner ends with spring held centering pins adapted to seat in lathe centers of the central member and retract within the first rams as they are moved into firm endwise engagement with the center member.

7. The subject matter of claim 1 wherein said first hydraulic means forces said first rams against the central member with greater force than said second hydraulic means exerts against said second rams when the first and second members are forced onto the central member.

8. In a hydraulic forcing press for pressing the hubs of a pair of railroad car wheels onto the end portions of an elongated axle,
   a. a frame having a pair of horizontally spaced upright standards rigidly interconnected by upper and lower pairs of tie rods,
   b. a mechanism supported by the frame for holding the axle in a horizontal position extending longitudinally between said standards,
   c. mechanism supported by the frame for holding a railroad car wheel at each end of the axle with the wheel hub in spaced relation to the axle but in axial alignment therewith,
   d. a double-ended first hydraulic press means mounted on the standards for exerting inward endwise force against opposite endwise force against opposite ends of the axle so as to exert a spreading force on the standards to stretch and prestress the tie rods, and
   e. a second hydraulic press means on the frame adapted to move inwardly against a wheel hub and force it axially onto an end portion of the axle while the tie rods are in prestressed condition.

9. The subject matter of claim 8 wherein the force exerted by said first hydraulic press means against the axle is greater than the force exerted by the second hydraulic press means against the hub whereby the axle will be immovably held as the hub is pressed thereon.

10. The subject matter of claim 8 wherein said first press means has rams which extend through the wheel hubs into engagement with the axle.

11. The subject matter of claim 8 wherein said second hydraulic means has a cylindrical pressing head axially aligned with the wheel hub to engage against the outer side thereof and said first hydraulic means has a pressing ram movable axially within said cylindrical pressing head.

12. The subject matter of claim 8 wherein the second hydraulic press means is also double-ended for simultaneous pressing of the two wheel hubs onto the opposite end portions of the axle.

* * * * *